United States Patent [19]

Smith

[11] Patent Number: 4,872,151
[45] Date of Patent: Oct. 3, 1989

[54] COMPACT DISC PLAYER CAPABLE OF PLAYING PLURAL SELECTIONS RECORDED ON A COMPACT DISC IN A PRESELECTED SEQUENCE

[75] Inventor: Michael A. Smith, Slidell, La.

[73] Assignee: Bennie C. Fulkerson, Slidell, La. ; a part interest

[21] Appl. No.: 903,809

[22] Filed: Sep. 2, 1986

Related U.S. Application Data

[63] Continuation-in-part of Ser. No. 830,620, Feb. 19, 1986, abandoned.

[51] Int. Cl.$^4$ ............................................. G11B 15/06
[52] U.S. Cl. ........................................ 369/14; 369/33; 369/41; 369/47; 369/48; 369/32; 360/72.1; 360/72.2; 235/462
[58] Field of Search ....................... 369/14, 30, 32, 33, 369/34, 41–48, 50, 59, 233, 1768, 180; 360/72.1, 72.2, 78, 69, 133; 358/342; 235/487, 462

[56] References Cited

U.S. PATENT DOCUMENTS

| | | |
|---|---|---|
| 3,573,809 | 4/1971 | Magnien . |
| 3,584,882 | 6/1971 | Krtous et al. . |
| 3,876,297 | 4/1975 | Appeldorn et al. . |
| 4,114,181 | 9/1978 | Itoh . |
| 4,136,261 | 1/1979 | Wada . |
| 4,139,875 | 2/1979 | Tatara et al. . |
| 4,210,785 | 7/1980 | Huber et al. ................ 360/72.2 |
| 4,210,940 | 7/1980 | Prysby et al. ............... 360/72.3 |
| 4,224,644 | 9/1980 | Lewis et al. ................ 360/72.2 |
| 4,321,635 | 3/1982 | Tsuyuguchi ................. 360/77.2 |
| 4,329,575 | 5/1982 | Roach ......................... 235/487 |
| 4,338,644 | 7/1982 | Staar . |
| 4,341,952 | 7/1982 | John et al. .................. 235/487 |
| 4,360,728 | 11/1982 | Drexler . |
| 4,422,105 | 12/1983 | Rodesch et al. ............ 358/335 |
| 4,424,539 | 1/1984 | Keidl et al. . |
| 4,426,684 | 1/1984 | Sechet et al. ............... 364/900 |
| 4,476,499 | 10/1984 | Kanamaru et al. .......... 358/342 |
| 4,481,613 | 11/1984 | Yokota . |
| 4,503,135 | 3/1985 | Drexler . |
| 4,523,305 | 6/1985 | Cheeseboro ................. 369/14 |
| 4,527,265 | 7/1985 | d'Alsyer de Costemore d'Arc . |
| 4,538,253 | 8/1985 | Ishibashi et al. ............ 369/34 |
| 4,675,755 | 6/1987 | Baumeister et al. ........ 360/133 |
| 4,677,604 | 6/1987 | Selby, III et al. ........... 235/462 |
| 4,779,252 | 10/1988 | Custers et al. .............. 369/32 |

FOREIGN PATENT DOCUMENTS

| | | |
|---|---|---|
| 0169597 | 1/1986 | European Pat. Off. . |
| 2520914 | 8/1983 | France . |
| 56-25273 | 3/1981 | Japan .................. 358/342 |
| 57-181405 | 11/1982 | Japan . |
| 59-40379 | 3/1984 | Japan . |
| 59-215076 | 12/1984 | Japan .................. 369/33 |
| 7901801 | 9/1980 | Netherlands . |
| 2062935 | 5/1981 | United Kingdom .......... 369/30 |
| 2091021 | 7/1982 | United Kingdom .......... 369/47 |
| 2102184 | 1/1983 | United Kingdom . |

Primary Examiner—Alan Faber
Assistant Examiner—Hoa T. Nguyen
Attorney, Agent, or Firm—Antonelli, Terry & Wands

[57] ABSTRACT

A compact disc having digitally encoded, reproducible data recorded in tracks on a playing side and having an editing device for storing order of play data to control the sequence in which the tracks are played is provided. The editing device can be on the nonplaying side of the compact disc. A compact disc reproduction system, specially equipped to play discs having editing devices thereon, has a read/write head for reading order of play data from the editing device and for selectively encoding the editing device with order of play data. An internal memory stores order of play data in the disc player. Alternatively, the editing device can be a separate item from the compact disc, to be inserted in a reader on the reproduction system. Another preferred compact disc player plays conventional discs loaded therein by scanning each disc to receive data for identifying the disc. The identifying data can be the number of tracks and the duration of each track on the playing side of the disc. Alternatively, it can be an identification code enscribed on the disc surface. This disc identification data is compared with identification data stored in a memory to determine whether order of play data has already been stored for the disc. Upon detection of a match, a central controller looks up the order of play data assigned for the disc and commences play according to the preprogrammed sequence.

23 Claims, 4 Drawing Sheets

COMPACT DISC PLAYER CAPABLE OF PLAYING PLURAL SELECTIONS RECORDED ON A COMPACT DISC IN A PRESELECTED SEQUENCE

CROSS REFERENCE TO RELATED APPLICATION

This application is a continuation-in-part of pending U.S. application Ser. No. 830,620 filed Feb. 19, 1986, now abandoned.

BACKGROUND OF THE INVENTION

The present invention pertains to compact discs or laser discs having encoded, reproducible tracks thereon. More particularly, the present invention pertains to such discs having editing means for selectively providing order of play data or other data either on the disc itself or provided separately. The present invention further pertains to a compact disc system including means for reading the order of play data from the editing means and for programming the compact disc player according to that data and means for selectively programming the editing means with order of play data. The compact disc might store audio data, video data, text, or software, or even a combination of these. The invention is particularly suited for audio data such as compact disc sound recordings, and the present invention will be described in connection with such a system, but it is likewise usable with video data, text, or software.

The editing means can be discrete programmable indicia on the compact disc which are readable by means on the disc player. Alternatively, the editing means can be means for scanning the playing side of a disc loaded into the player to detect the boundaries of the tracks thereon and means for comparing an identification code derived from the track boundary data with data in a table stored in a memory.

The prior art has lacked a preprogramming device provided with a compact disc for furnishing order of play data or data setting forth particular parameters of the disc. Rather, such prior art compact discs generally have a first side with digitally encoded, audio reproducible data thereon and a blank second side. The audio reproducible data might be organized into a plurality of spiral tracks arranged concentrically on the disc. Each track corresponds to, for example, a single selection of music.

Prior art compact disc players include a drawer-like receptacle for receiving the compact disc, positioning it, and rotating it to enable scanning by a playback system such as a laser system. The audio reproducible data modulates the laser light reflected from the disc, and the reflected, modulated beam is in turn demodulated to produce audio signals. The laser beam progresses spirally toward the center of the disc, along the tracks, to reproduce the audio signals.

Many conventional compact disc players feature internal memories providing capability for storing one or more programs controlling the desired order of the play of the tracks of the disc. This capability is provided since users frequently favor particular musical selections over others in the set of selections recorded on the various tracks upon the disc. The favored selections, however, are often recorded upon nonadjacent tracks so that less favored selections are interposed between those the user particularly desires to hear. Likewise, the listener may desire to hear all the selections recorded on the compact disc but in an order other than that in which they are recorded. By means of internal memories the compact disc player may be preprogrammed to play the individual tracks in any desired order, including skipping particular tracks or playing favored tracks more than once.

Many conventional compact disc players can be programmed for a particular order of play by means of a keyboard or the like arranged upon the control panel of the player. Once a compact disc is inserted and the player thus programmed, play is initiated, and the player proceeds to play the tracks on the disc in the preselected order. Such conventional programmable compact disc players require relatively complex programming in order to preset the order of play for each disc to be played, since the precise operation of the several memory and play controls must be understood to operate the player. Where the user desires to play more than one disc, with the selections on each played in a different sequence, several repetitions of the programming steps are required, and this is likely to become tiresome. This tediousness is aggravated if frequent recourse to instructions for programming the player is required. Moreover, persons whose capacity to understand and repeat the particular sequences of programming steps is limited, such as children, are likely to become frustrated due to inability to operate the machine rapidly. Worse, they may damage the machine in attempting to operate Thus up to now, conventional compact disc players have lacked means whereby the disc itself provides order of play data or other data which may be automatically recognized and read by the player. In such a system, the disc may be simply received by the player and the play initiated so that thereafter the player self-programs and the recorded selections according to the instructions encoded the disc.

To a very the prior art has provided control data storage me a prerecorded medium from which audio or other signals be reproduced. U.S. Pat. No. 4,338,644 to Staar discloses a magnetic tape cassette which is provided with an electronic memory, including semiconductor circuits. The electronic memory is housed within the cassette and is read by a peripheral device which indicates, for example, the instantaneous position of the tape or the location of specific selections on the tape from information stored in the cassette memory. The memory can likewise be read by a properly equipped cassette player when the player receives the cassette.

U.S. Pat. No. 3,876,297 to Appeldorn et al. shows a transparent slide frame which is provided, on one face, with a strip of magnetic recording tape. When the slide frame is positioned for projection of the image thereon, the magnetic strip may be read to reproduce an identifying message.

U.S. Pat. No. 4,424,539 shows a magnetic disk having a central track which may be read through the disk envelope. The patent states that the normal data track lies toward the concentric interior portion of the disk and the outward portions thereof do not normally contain data. Thus the patent discloses the placement of control tracks, readable through the disk envelope on such outward portion. The control tracks which may comprise one or more distinct tracks are encoded with control function data such as index pulse, sector signals, velocity feedback and/or a media alignment signal.

SUMMARY OF THE INVENTION

The present invention is a compact disc system which overcomes these shortcomings of prior art compact disc systems. The present invention provides means for automatically controlling a compact disc system, particularly for controlling a compact disc player to cause it to play selections recorded on a compact disc in accordance with order of play data. In one preferred embodiment, a compact disc has an editing device having order of play data recorded thereon, and a compact disc player is equipped with means for reading the order of play data and means for transferring the data to an internal memory, which may comprise standard memory circuits as found in conventional compact disc players. The disc player reads the order of play data and is then preprogrammed with the order of play data. The player may thereafter be made to play selections from the tracks on the disc in the order provided by the memory.

Alternatively, the editing device of the present invention may simply direct the player to play the selections in the order of their recording on the disc.

According to the present invention, the disc player further includes means for writing new data on the editing device. The user can thus write over or erase old order of play data and record new such data on the editing device.

Thus, in accordance with this preferred embodiment of the invention, a specially equipped compact disc adapted specifically for use in a compact disc player controlled in accordance with the present invention includes a compact or laser disc having encoded, laser reproducible audio data on one side thereof and an aperture through its central portion for receiving the spindle of the turntable. In one preferred embodiment of the invention a compact disc editing device which stores order of play data is disposed upon the side of the disc opposite that of the audio data. Atlternatively, the editing device can be provided as a separate component, such as a cardboard or paper strip.

A compact disc player apparatus in accordance with this embodiment of the present invention, especially equipped for playing compact discs having editing means, includes means to receive data from the editing means and means for controlling the sequence in which the data are played in accordance with that order of play data. Such means for receiving order of play data includes means for reading such data and transmitting signals indicative of that data to a central controller such as those found in state of the art compact disc players. Receiving these signals, the controller effects transfer of the order of play data to memory circuits, internal to the disc player for temporary storage therein. After the controller terminates the reading cycle, the player is ready to reproduce the selections recorded on the disc in the order of play sequence thus programmed into the disc player memory. Means for writing alternative order of play data on the editing device is further provided. In subsequent play of the disc the modified or rewritten data is read by the disc player to control the sequence in which the selections are played.

In a second preferred embodiment, the disc player scans each conventional compact disc loaded into the player to collect identification data characteristic of the disc. The collected disc identification data is compared with identification data stored in a memory to determine whether or not order of play data for the loaded disc has been preprogrammed in the memory. Upon detection of a match between the collected disc identification data and stored disc identification data, the order of play data for the particular disc is read, and the compact disc player then proceeds to play the selections on the disc in sequence according to that order of play data. The disc identification data is data inherently on a disc uniquely characteristic of that disc. By way of example, the number of tracks on the disc and the playing times of the several tracks constitute a unique combination of data characteristic of the disc and so can be used as the disc identification data.

This preferred embodiment of the invention is thus adapted for playing conventional compact discs in the listener's favored sequence. Such a player includes means for scanning a conventional compact disc loaded into the player to sense the boundaries of the several tracks recorded thereon and then to provide a signal indicating the number of tracks and the playing times of the tracks. The first time a particular disc is loaded into the player, the tracks are scanned to determine this data and to derive the collected disc identification data therefrom. The listener supplies order of play data by input buttons or keys as in a conventional compact disc player. This collected disc identification data and order of play data are then stored in memory within the player. When that same disc is subsequently loaded into the player and the tracks scanned to obtained the collected disc identification data, that collected data is compared with stored disc identification data, and when a comparison is found, the tracks of the disc are played in the sequence specified by the corresponding stored order of play data.

BRIEF DESCRIPTION OF THE DRAWINGS

These and other aspects and advantages of the present invention are more apparent from the following detailed description and claims, particularly when considered in conjunction with the accompanying drawings in which like parts bear like reference/numerals. In the drawings:

DESCRIPTION OF THE PREFERRED EMBODIMENTS

Figure 1:
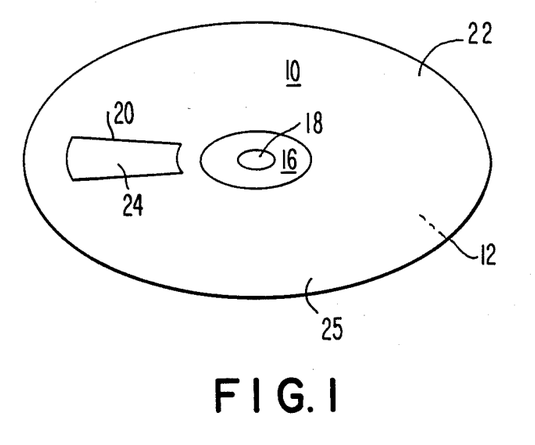
FIG. 1 is a plan view of a compact disc including a compact disc editing device in accordance with one embodiment of the present invention.

With reference to FIG. 1, compact or laser disc 10 includes a playing side 12 having various selections such as musical pieces recorded thereon in a microscopic digital code (not shown). The digital coding is adapted for audio reproduction and, as well known to those skilled in the art, may comprise indentations or oblong pits (not shown in FIG. 1) which have the effect of modulating a laser beam passed thereover. On playing side 12, the digital coding or data is grouped in a plurality of spiralling tracks (not shown) originating near the radially outermost region of disc 10 and radially progressing toward the center of the disc. Each track may correspond to a particular prerecorded selection such as a musical selection or musical piece. Near the center of disc 10 drive plate portion 16 has an aperture 18 for rotation of disc 10.

As further shown in FIG. 1, disc 10 is provided with an editor or editing means 20 disposed on non-playing side 22 of disc 10, opposite playing side 12. As depicted in the drawings, editor 20 is in the form of a radial strip 24, however, as will be evident to those skilled in the art, editor 20 may have any other suitable shape.

In the embodiments shown in FIGS. 1-4, editor 20 comprises a strip 24 of a magnetic recording medium upon nonplaying side 22 of disc 10. Similar strips are commonly used in the fabrication of credit cards, automatic bank teller cards, transportation system fare cards, and the like. Thus, magnetic strip 24 is erasably encodable with order of play data.

Magnetic strip 24 may be attached to nonencoded side 22 of disc 10 by an adhesive, or alternatively, strip 24 may be implanted in the material composing disc 10 such as during the fabrication of disc 10. Both playing side 12 and nonplaying side 22 are preferably covered with a plastic coating 25 to protect both the digital coding (not shown) on side 12 and magnetic strip 24 on side 22, so long as data can be encoded on and read from strip 24.

On compact discs which do not have their playing sides substantially covered with audio reproducible data, editing means in accordance with the present invention could readily be placed upon the playing side rather than on the nonplaying side, and the resulting compact disc would remain well within the scope of the present invention. Likewise, it is recognized that the editor may be imparted with other data in addition to, or instead of, order of play data, such as information concerning particular characteristics of the disc or even the disc player.

Figure 2:
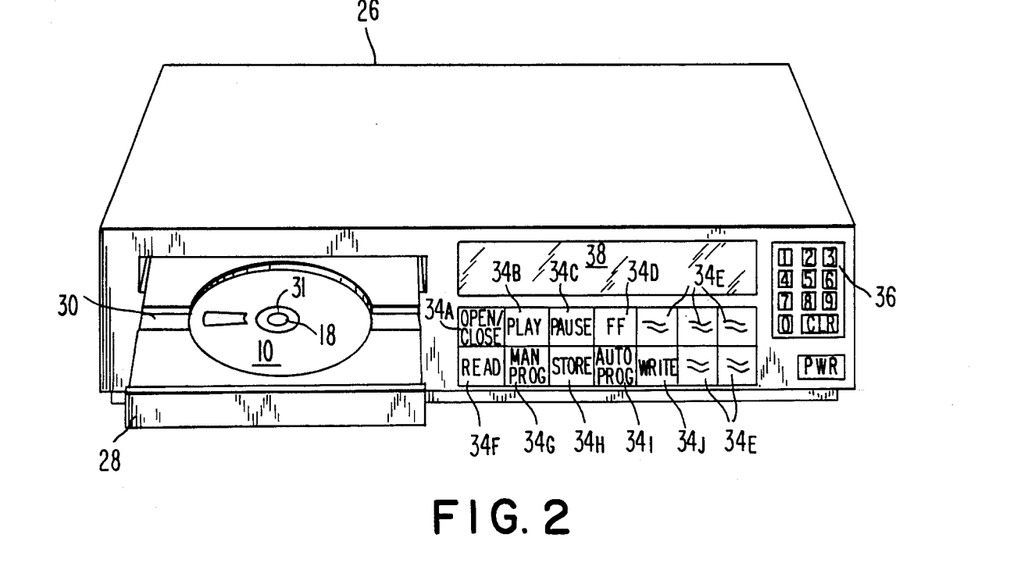
FIG. 2 is a perspective view of a compact disc player suitable for playing the compact disc shown in FIG. 1.
Figure 3:
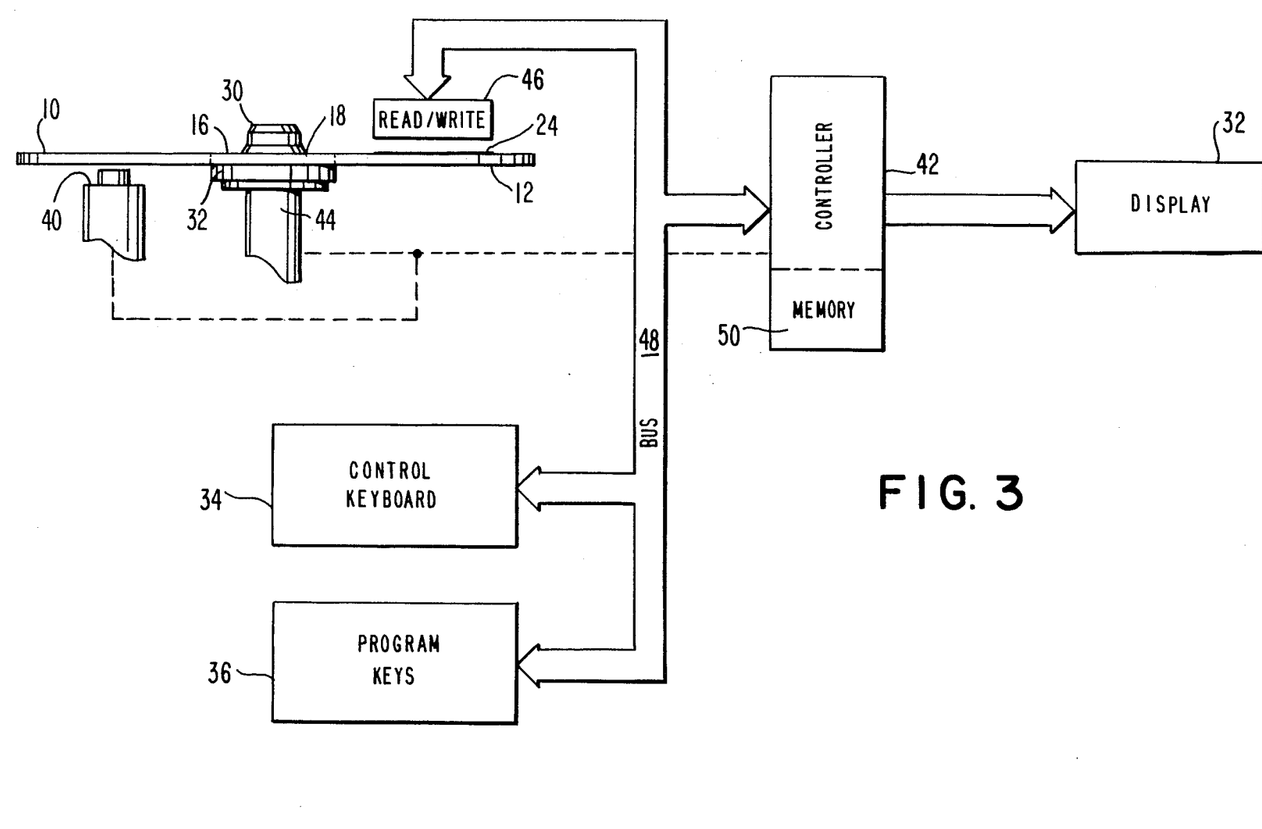
FIG. 3 is a partial block diagram showing the order of play control portion of the compact disc player of FIG. 2.

FIG. 2 shows a compact disc playing apparatus 26 which is well suited to receive discs constructed according to the present invention. Disc playing apparatus 26 includes a tray 28 of the front loading type, shown in its open position in FIG. 2. Disc 10 lies upon a turntable 30 within tray 28 of playing apparatus 26 with spindle 31 received by aperture 18 of the disc. As best shown in FIG. 3, drive plate portion 16 of disc 10 contacts drive plate 32 of turntable 30 as disc 10 rests upon the turntable bed.

In addition to tray 28, disc player 26 further includes two sets of manually operated controls 34 and 36, shown in the form of pushbutton switches or keys in FIG. 2. Display 38 is also provided upon the front face of playing apparatus 26 for displaying different types of information or data relating to the discs or the audio reproducible data on the discs.

As shown in block diagram form in FIG. 3, the operative elements of the order of play control system of compact disc player 26 include a laser 40 for directing a coherent light beam incident to playing surface 12 of disc 10. Laser 40 is conventional and operates in the manner well known to those skilled in the art. Preferably, as indicated by the broken line in FIG. 3, the operation and position of laser 40 is regulated by a central controller 42 which might, for example, comprise a microprocessor or like digital circuitry.

Drive plate 32 is made to rotate with shaft 44. Rotation of shaft 44 also may be effected by means common to conventional compact disc players and need not be described here. As with laser 40, it is preferable to control the rotation of shaft 44 and therefore disc 10 by central controller 42.

Controls 34 on control keyboard provide means for user control over central controller 42 and thus over any of the functions of compact disc player 26. For instance, as shown in FIG. 2, controls 34 may include an OPEN/CLOSE control 34A for tray 28; a PLAY control 34B; a PAUSE control 34C; a FAST FORWARD control 34D; or any of a plurality of control functions generally indicated by keys 34E which are associated with conventional compact disc players.

Unique to the present invention, READ control key 34F, when operated by the user, directs controller 42 to cause read/write device 46 (FIG. 3) to read data from strip 24. Device 46 transmits signals indicative of such data to memory 50 wherein the data is stored in order to control the operation of player 26. When device 46 indicates, in any of several well known ways, that all order of play data has been transmitted to controller 42, controller 42 terminates the order of play data read cycle. Memory 50 may comprise any RAM memory or the like such as that incorporated into conventional programmable compact disk players.

Once a reading cycle has been completed by controller 42, operation of PLAY control 34B causes player 26 to automatically play the selections recorded o side 12 of disc 10 in the order recorded from editor 20 into memory 50. Upon play of the last programmed selection, player 26, as is evident to those skilled in the art, may be made to remain in a quiescent "on" state, ready for further instructions from the operator, or to automatically shut off.

To provide for more automatic play, PLAY control 34B may be activated concurrently with READ key 34F. Under the simultaneous influence of these two user-activated controls, central controller 42 first executes reading and storing of the order of play data from strip 24 and then causes the selections on disc 10 to be reproduced in the order given by that data.

Alternatively, in the event that the user desires to have the selections recorded on disc 10 reproduced or played in an order different than that encoded on strip 24, or in the event that strip 24 has been either purposely or inadvertently erased or to enable use of compact disc playing apparatus 26 with prior art compact discs not having an editing device 20, MANUAL PROGRAM control 34G may be operated to permit direct entry of order of play data into memory 50 by the user. Under the direction of MANUAL PROGRAM control 34G, controller 42 receives and transfers to memory 50 order of play data entered at programming control keys 36. Following the programming of the desired sequence, manual programming is terminated by depression of the STORE control 34H. Entry of order of play data in the MANUAL PROGRAMMING mode does not change nor add any data to strip 24. It is thus seen that, placed in the MANUAL PROGRAMMING mode by means of control key 34G, controller 42 operates in the manner of conventional programmable compact disc players.

Read/write device 46 is also capable of writing order of play data on strip 24 under the control of central controller 42. With reference again to FIGS. 2 and 3, encoding of order of play data on strip 22 is carried out by first activating AUTO PROGRAM control 34I followed by the entering of order of play data by means of programming keys 36. In response to operation of the AUTO PROGRAM control 34I, central controller 42 causes receipt of the data entered at keys 36 into internal memory 50. Next, operation of the WRITE control 34J causes controller 42 to transmit the contents of memory 50 to read/write device 46 whereupon it is written on strip 24. The writing cycle carried out by controller 42 on editor 20 then terminates. Preferably, the entered order of play data is also retained in memory 50 so that subsequent depression of PLAY control 34B causes player 26 to execute audio reproduction in the user's programmed sequence.

At all times, data indicative of, for example, the currently playing track and/or the elapsed time of play may be displayed at display 38. When player 26 is placed in either the READ mode or the WRITE mode to receive data from or write data on editing device 20, display 38 preferably displays such data as it is read or written, for example by a sequence of numerical representations. When player 26 is placed in the mode corresponding to "MANUAL PROGRAM", display 38 preferably displays the order of play data as it is entered by the user. Display 38 may thus take the form of any of the various display arrangements known to those skilled in the art.

With reference again to FIGS. 2 and 3, it is evident to those skilled in the art that turntable 30 of tray 28 could be constructed to engage an entire side of disc 10 rather than only drive plate portion 16. In such an embodiment, tray 28 would receive disc 1 with playing side 12 facing upwards and laser 40 would be positioned over the disc. Read/write device 46 could then be disposed directly upon such a turntable or the turntable could have an aperture for housing read/write device 46 and permitting operative association between editor 20 and read/write device 46.

Figure 4:
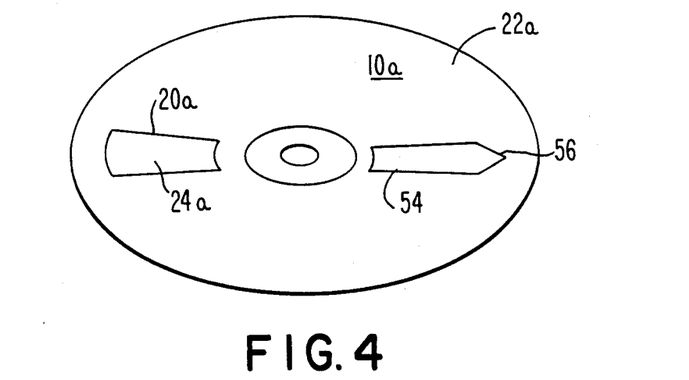
FIG. 4 is a plan view of a second embodiment of a compact disc according to the present invention.

Preferably, in response to operation of READ control 34F or WRITE control 34J, controller 42 itself automatically causes rotation of disc 10 until device 46 and strip 24 are relatively aligned to insure reliable order of play data transfer. Alternatively, as shown in FIG. 4, an alignment marker 54 may be provided on disc 10a on the same side 22a as editing device 20a. The arrow end 56 of marker 54 aligns with a similar marker (not shown) on the turntable 30 or elsewhere on a disc player to permit manual alignment of disc 10a within the disc player before the tray 28 is closed. As another alternative, the transfer of order of play data might take place as strip 24 passes beneath read/write device 46 during rotation of disc 10. Further, another alternative is to read order of play data from strip 24 after the playing of each selection of recorded data on side 12 has been completed, so as to determine the next selection to be played. This eliminates the need to store the order of play data in memory 50.

As is evident to one skilled in the art, compact disc 10 having an editing device 20 is suitable for use with a compact disc player of the remote control type. In use, in such remote control players, disc 10 is loaded into the tray of the player. The player is then operated in a manner similar to that described above, the primary difference being that rather than at controls such as controls 34 and 36, or in addition to such controls, the player could be operated by a remote control module such as a hand-held control box.

Figure 5:
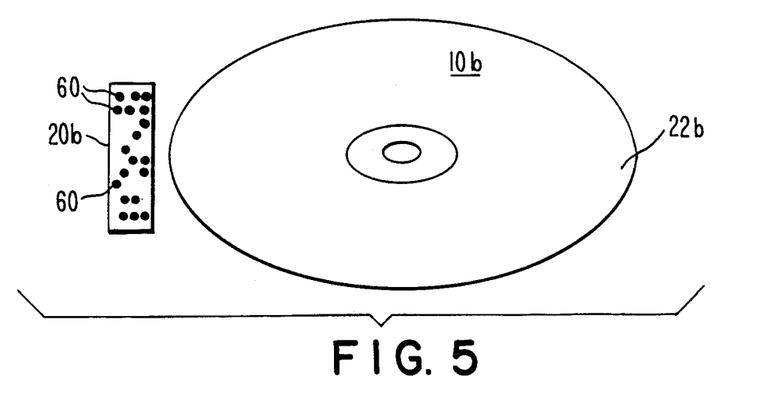
FIG. 5 is a plan view of another embodiment of a compact disc in accordance with the present invention.

FIG. 5 shows another embodiment of a compact disc 10b in accordance with the present invention which is provided with an editing device in the form of a paper or cardboard strip 20b having a particular pattern of punch-outs 60 thereon. Strip 20b can be provided as a separate item from disc 10b, storable in a slot on the container holding disc 10b when not in use. Alternatively, strip 20b can be mounted on nonencoded side 22b of disc 10b. The punch-outs on strip 20b correspond to prerecorded order of play data which is read in any manner well known to those skilled in the art by a reader mounted on player 26.

Figure 6:
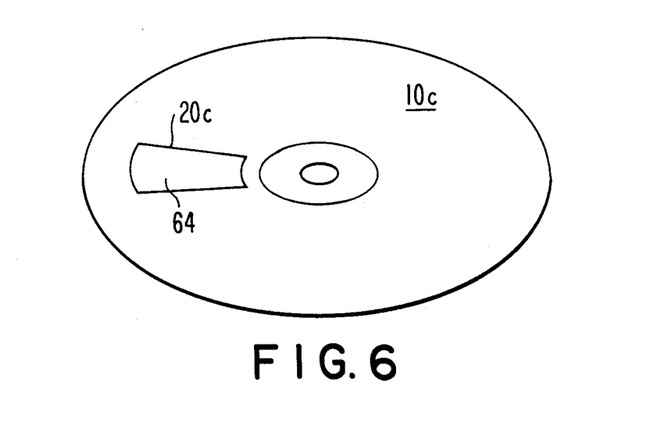
FIG. 6 is a plan view of still another embodiment of a compact disc in accordance with the present invention.

FIG. 6 shows a disc 10c having editing means 20c in the form of a tag 64 having light sensitive encoded order of play data, in a manner similar to that used in conventional automatic point of sale or automatic cash register systems. As is likewise apparent to those skilled in the art, editor 20c may be read by sensing means common to such systems. It is to be understood that strip 20b and tag 64 of embodiments of FIGS. 5 and 6 respectively would be substantially unalterable such that once being encoded with order of play data, that data could not be changed, but could be ignored by a compact disc player such as player 26 when operated in the MANUAL PROGRAMMING mode.

Figure 7:
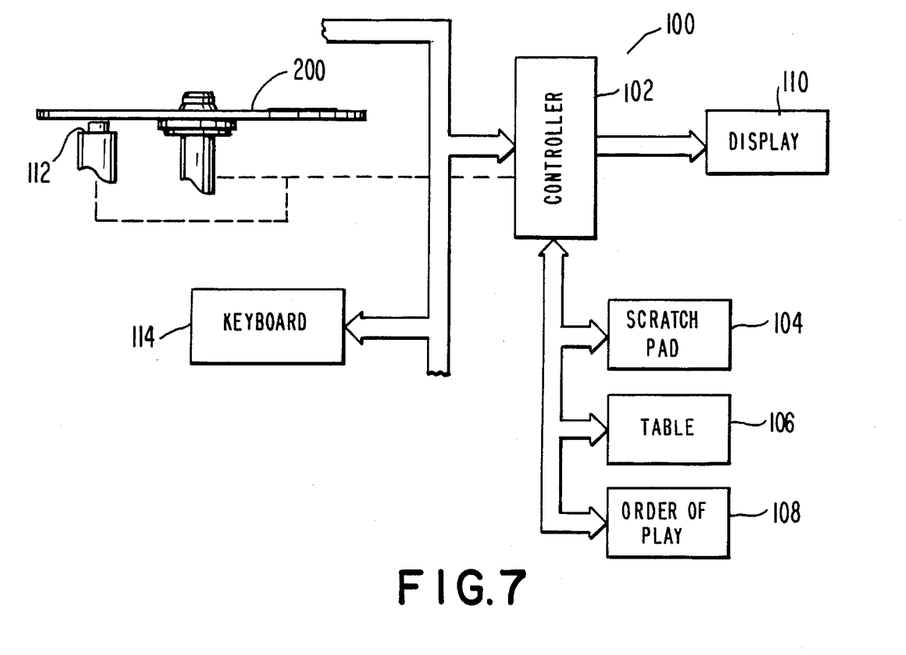
FIG. 7 is a partial block diagram showing the order of play and disc identification control portion of another preferred compact disc player especially suited to facilitating play of conventional compact discs.

FIG. 7 shows an alternative compact disc playing system 100, especially suited to playing conventional compact discs, although player 100 can play compact discs of the type depicted in FIG. 1 and FIGS. 4–6 as well. Preferred system 100 is directed to facilitating play of conventional discs.

Like compact disc system 26, operation of system 100 is centralized by means of controller 102 in communication with each of three memories 104, 106 and 108. Memories 104, 106 and 108 are depicted as individual memories for the sake of convenience; however, as is evident, each of the memories 104, 106, and 108, independently shown in FIG. 7, could constitute one portion of a single memory device which could, if desired, be made a part of controller 102, similar to controller 42 and memory 50 in system 26. Controller 102 likewise communicates with a user display 110.

Figure 8:
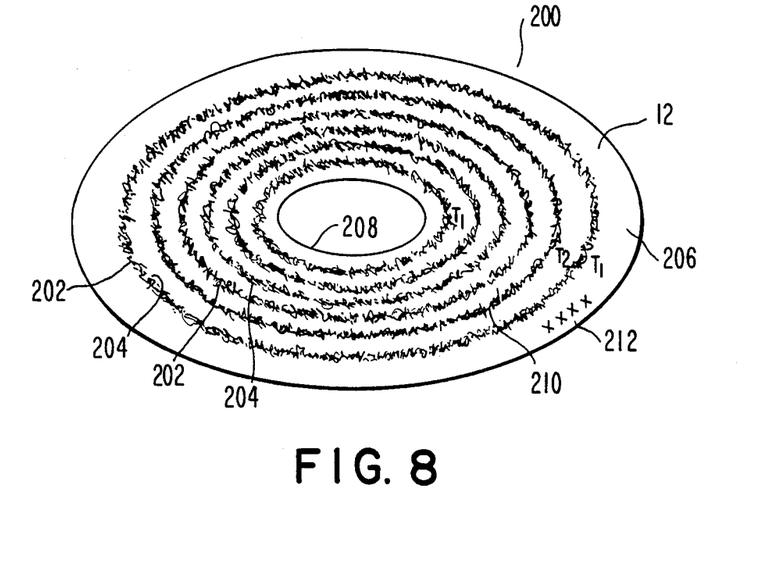
FIG. 8 is a plan view showing in exaggeration the sequence of tracks on the playing side of a conventional compact

With reference to FIG. 8, the playing side 12 of another compact disc 200 is shown face-up. Playing side 12 has a plurality of spiralling tracks $T_1, T_2, \ldots T_i \ldots T_n$ corresponding to N recordings on disc 200. For purposes of explanation, the tracks $T_1 \ldots T_n$ are shown as very exaggerated, as are the boundaries between those tracks. As discussed above, the digital coding is located within the bounds of tracks $T_1$-$T_n$. Each track has an outermost boundary 202 and an innermost boundary 204, and these boundaries 202 and 204 are detectable by laser 112. As laser 112 scans radially from the outer edge 206 toward the center 208 of disc 200, it senses boundaries 202 and 204 of each track as they are traversed. Controller 102 interrogates laser 112 to provide a signal representing each boundary 202 or 204 as it traverses disc 200. The signals could be the same so that each odd-numbered signal indicates an outer boundary 202 and each even numbered signal indicates an inner boundary. Alternatively, laser 112 could provide a distinct signal for an outer boundary and another distinct signal for an inner boundary.

Each track $T_1 \ldots T_n$ has a characteristic width $W_1, W_2, \ldots W_i, \ldots W_n$ or distance between its outer boundary 202 and its inner boundary 204. Where laser 112 scans across disc 200 each width $W_i$ corresponds to the time of play for the recording on the associated track $T_i$. As no disc, other than an identical disc having all of the same recordings in the same order, is likely to have the same number of tracks and identical track widths, the number of tracks on a disc, together with the width or playing time for each track, provides an identifying code for that particular disc. Thus, by furnishing controller 102 with signals indicating each boundary 202 and/or 204, laser 112 provides controller 102 with the identification code for the particular disc scanned. In this way, laser 112 performs the dual functions of scanning disc 200 in order to identify it and in order to reproduce the recordings thereon. Alternatively, separate laser scanners could be provided to carry out each of these functions, and the resulting player would still be well within the scope of the present invention.

Controller 102 receives the boundary-indicating signals from laser 112, calculates the width $W_i$ for each track $T_i$ scanned, and registers these data in scratch pad memory 104. Once laser 112 has fully scanned the disc 200 in this manner, controller 102 compares the identification code now stored in scratch pad 104 with codes stored in a table-memory 106, having stored therein previously programmed disc codes, in an attempt to identify the particular disc 200. Once the comparison by controller 102 identifies a disc 200 as one for which corresponding identification data has previously been stored in table-memory 106, controller 102 looks up the particular order of play code in memory 108 for that disc. In this way, system 100 is equipped to automatically play a loaded disc according to the user's preferred order of play.

Where a new disc, not having previously been scanned or played by system 100, is loaded therein, the system is preprogrammed by both the user at a keyboard 114 and by laser 112. Once the new disc has been scanned and controller 102 has failed to find an identification code corresponding to the disc, the controller prompts the user to enter order of play data for the new disc. Controller 102 causes registration of the disc 200 in memory 106 by causing entry into memory 106 of the identification data for the disc 200 together with the order of play data for the disc as such data is received via keyboard 114. Thereafter, when the now registered disc is inserted into tray 28, system 100 is prepared to play the disc according to the user's favored sequence.

As another alternative, each compact disc 200 could have on its playing side an identification code 212 which is read by laser 112 when the disc is first inserted into the player. The identification code 212, encoded on disc 200 during manufacture, serves to identify the disc just as does the number and widths of the tracks $T_1 \ldots T_n$.

Although the present invention has been described with reference to preferred embodiments, numerous modifications, rearrangements, and substitutions could be made, and the result would remain within the scope of the invention.

What is claimed is:

1. A compact disc player for reproducing signals from a compact disc loaded therein, the disc having digitally encoded, reproducible data recorded thereon organized in a plurality of spiralling tracks, each of the tracks recording a different selection of reproducible data and having a track width defined by an outermost boundary and an innermost boundary, the number of tracks and the track widths on a disc defining a disc identification code for such disc, said disc player comprising:

means for receiving a compact disc upon loading of such disc thereinto;

means for scanning a disc loaded into said receiving means to sense the track boundaries of tracks on a disc loaded into said receiving means and for generating a signal upon detecting of each track boundary on the disc;

a emory for storing disc identification codes and order or play data corresponding to preselected compact discs;

means for generating output signals from the digitally encoded data on a compact disc located in said receiving means; and control means connected to said scanning means, said memory, and said output signal generating means and responsive to signals from said scanning means for determining the disc identification code of the loaded disc, comparing the determined disc identification code with disc identification codes already stored in said memory and when a comparison is found reading from said memory the corresponding order of play data, and causing said output signal generating means to generate output signals from the digitally encoded data in the tracks on the loaded compact disc in a track order defined by the read order of play data to reproduce the different selections of reproducible data in such track order sequence.

2. A compact disc player as claimed in claim 1 in which said output signal generating means generates audio output signals.

3. A compact disc player as claimed in claim 1 in which said scanning means scans the loaded disc at constant speed and said control means determines the disc identification code for the loaded disc from the track widths and the number of tracks on the loaded disc.

4. A compact disc player as claimed in claim 1 in which said control means includes means for storing the determined disc identification code for the loaded disc in said memory when not comparison is found between the determined disc identification code and already stored disc identification codes.

5. A compact disc player as claimed in claim 4 further comprising display means and a keyboard for accepting order of play data from a user, said control means including means for generating on said display means a prompt display prompting the user to apply order of play data at said keyboard when no comparison is found between the determined disc identification code and the already stored disc identification codes, said control means causing the applied order of play data to be stored in said memory in correspondence with the newly stored disc identification code.

6. A compact disc player as claimed in claim 1 wherein said scanning means includes a laser.

7. A compact disc player for reproducing signals from a compact disc loaded therein, the disc having recorded thereon digitally encoded, reproducible data organized in a plurality of spiralling tracks, each of the tracks recording a different selection of reproducible data, the disc further having recorded thereon a disc identification code for such disc, said disc player comprising:

means for receiving a compact disc upon loading of such disc thereinto;
 means for reading the disc identification code from a compact disc loaded into said compact disc receiving means;
 a memory for storing disc identification codes and order of play data corresponding to preselected compact discs;
 means for generating output signals from the digitally encoded data on a compact disc loaded in said receiving means; and
 control means connected to said reading means, said memory, and said output signal generating means and responsive to signals from said reading means for determining the disc identification code of the loaded disc, comparing the determined disc identification code with disc identification codes already stored in said memory, and when a comparison is found reading from said memory the corresponding order of play data and causing said output signal generating means to generate output signals from the digitally encoded data in the tracks on the loaded compact disc in a track order defined by the read order of play data to reproduce the different selections of reproducible data in such track order sequence, said control means including first means adapted for storing in said memory the determined disc identification code for the loaded disc when no comparison is found between the determined disc identification code and already stored disc identification codes.

8. A compact disc player as claimed in claim 7 in which said output signal generating means generates audio output signals.

9. A compact disc player as claimed in claim 7 further comprising display means and a keyboard for accepting order of play data from a user, said control means further including second means responsive to said control means failing to find a comparison between the determined disc identification code and the already stored disc identification codes for causing said first means to store in said memory the determined disc identification code for the loaded disc, for generating on said display means a prompt display prompting the user to apply order of play data at said keyboard and for causing the applied order of play data to be stored in said memory in correspondence with the newly stored disc identification code.

10. A compact disc player as claimed in claim 7 wherein said scanning means includes a laser.

11. A compact disc player for reproducing signals from a compact disc loaded therein, the disc having recorded thereon digitally encoded, reproducible data organized in a plurality of spiralling tracks, each of the tracks recording a different selection of reproducible data, said disc player comprising:

means for receiving a compact disc upon loading of such disc thereinto;
 means for scanning a disc loaded into said receiving means to sense characteristics of the loaded disc and for generating a signal upon sensing of such characteristics;
 a memory for storing disc identification codes and order of play data corresponding to preselected compact discs;
 means for generating output signals from the digitally encoded data on a compact disc loaded in said receiving means; and
 control means connected to said scanning means, said memory, and said output signal generating means and responsive to signals form said scanning means for determining a disc identification code for the loaded disc, comparing the determined disc identification code with disc identification codes already stored in said memory, and when a comparison is found reading from said memory the corresponding order of play data and causing said output signal generating means to generate output signals from the digitally encoded data in the tracks on the loaded compact disc in a track order defined by the read order of play data to reproduce the different selections of reproducible data in such track order sequence, said control means including first means adapted for storing in said memory the determined discs identification code for the loaded disc when no comparison is found between the determined disc identification code and already stored disc identification codes.

12. A compact disc player as claimed in claim 11 in which said reading means reads an identification code recorded on the loaded compact disc adjacent the plurality of spiralling tracks.

13. A compact disc player as claimed in claim 11, for reproducing signals from a compact disc on which each of the spiralling tracks has a width defined by an outermost boundary and an innermost boundary, in which said reading means comprises means for sensing the track boundaries of tracks on the loaded compact disc and generating a signal upon detecting of each track boundary, the detected signals comprising the signals from said reading means to control means is responsive.

14. A compact disc player as claimed in claim 13 in which said scanning means scans the loaded disc at constant speed and said control means determines the disc: identification code for the loaded disc from the track widths and the number of tracks on the loaded disc.

15. A compact disc player as claimed in claim 11 in which said output signal generating means generates audio output signals.

16. A compact disc player as claimed in claim 11 in which said control means includes means for storing the determined disc identification code for the loaded disc in said memory when no comparison is found between the determined disc identification code and already stored disc identification codes.

17. A compact disc player as claimed in claim 11 further comprising display means and a keyboard for accepting order of play data from a user, said control means further including second means responsive to said control means failing to find a comparison between the determined disc identification code and the already stored disc identification codes for causing said first means to store in said memory the determined disc identification code for the loaded disc, for generating on said display means a prompt display prompting the user to apply order of play data at said keyboard and for causing the applied order of play data to be stored in said memory in correspondence with the newly stored disc identification code.

18. A compact disc player as claimed in claim 11 wherein said scanning means includes a laser.

19. A compact disc player for reproducing signals from a compact disc loaded therein, the disc having recorded thereon digitally encoded, reproducible data organized in a plurality of spiralling tracks, each of the tracks recording a different selection of reproducible data and having a track width defined by an outermost boundary and an innermost boundary, said disc player comprising:

means for receiving a compact disc upon loading of such disc thereinto;

means for scanning a disc loaded into said receiving means to sense the track boundaries of tracks on the loaded disc and for generating a signal upon detecting of the track boundaries;

a memory for storing the disc identification codes and order of play data corresponding to preselected compact discs;

means for generating output signals from the digitally encoded data on a compact disc loaded in said receiving means; and control means connected to said scanning means, said memory, and said output signal generating means and responsive to signals from said scanning means upon detecting of the track boundaries for determining a disc identification code for the loaded disc, comparing the determined disc identification code with disc identification codes already stored in said memory and when a comparison is found reading from said memory the corresponding order of play data and causing said output signal generating means to generate output signals from the digitally encoded data in the tracks on the loaded compact disc in a track order defined by the read order of play data to reproduce the different selections of reproducible data in such track order sequence.

20. A compact disc player as claimed in claim 19 in which said scanning means scans the loaded disc at constant speed and said control means determines the disc identification code for the loaded disc from the track widths and the number of tracks on the loaded discs.

21. A compact disc player as claimed in claim 19 in which said output signal generating means generates audio output signals.

22. A compact disc player as claimed in claim 16 further comprising display means and a keyboard for accepting order of play data from a user, said control means including means for generating on said display means a prompt display prompting the user to apply order of play data at said keyboard when no comparison is found between the determined disc identification code and the already stored disc identification codes, said control means causing the applied order to play data to be stored in said memory in correspondence with the stored determined disc identification code.

23. A compact disc player as claimed in claim 19 wherein said scanning means includes a laser.

* * * * *

UNITED STATES PATENT AND TRADEMARK OFFICE
CERTIFICATE OF CORRECTION

PATENT NO. : 4,872,151
DATED : October 3, 1989
INVENTOR(S) : Michael A. SMITH

It is certified that error appears in the above-identified patent and that said Letters Patent is hereby corrected as shown below:

Column 2, line 29, after "operate" insert --it.--;

line 36, after "and" insert --plays--;

line 38, after "very" insert --limited extent--;

line 39, delete "me" and substitute --means upon--.

Column 4, line 68, after "compact" insert --disc.--.

Column 6, line 42, cancel "o" and substitute --on--.

Column 8, line 32, cancel "206" and substitute --20b--.

Column 10, line 21, cancel "emory" and substitute --memory--;

UNITED STATES PATENT AND TRADEMARK OFFICE
CERTIFICATE OF CORRECTION

PATENT NO. : 4,872,151
DATED : October 3, 1989
INVENTOR(S) : Michael A. SMITH

It is certified that error appears in the above-identified patent and that said Letters Patent is hereby corrected as shown below:

Column 10, line 25, cancel "located" and substitute --loaded--.

Column 12, line 13, cancel "form" and substitute --from--;

line 53, cancel "11" and substitute --19--.

Column 14, line 27, cancel "to" and substitute --of--.

Signed and Sealed this

Eleventh Day of September, 1990

*Attest:*

HARRY F. MANBECK, JR.

*Attesting Officer*     *Commissioner of Patents and Trademarks*